(12) United States Patent
Tsuchida

(10) Patent No.: US 10,338,541 B2
(45) Date of Patent: Jul. 2, 2019

(54) MACHINE LEARNING TO ESTABLISH OPTIMAL FILTER FOR REMOVING EXTERNAL NOISE WITHOUT DEGRADING RESPONSIVITY

(71) Applicant: FANUC CORPORATION, Yamanashi (JP)

(72) Inventor: Kunio Tsuchida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 331 days.

(21) Appl. No.: 15/222,954

(22) Filed: Jul. 29, 2016

(65) Prior Publication Data

US 2017/0032284 A1 Feb. 2, 2017

(30) Foreign Application Priority Data

Jul. 31, 2015 (JP) ................. 2015-152682

(51) Int. Cl.

| G06N 7/02 | (2006.01) |
|---|---|
| G06N 7/04 | (2006.01) |
| G06N 7/06 | (2006.01) |
| G06N 7/08 | (2006.01) |
| G05B 13/02 | (2006.01) |
| G06N 20/00 | (2019.01) |

(52) U.S. Cl.
CPC ......... *G05B 13/0265* (2013.01); *G06N 20/00* (2019.01)

(58) Field of Classification Search
CPC ............................. G05B 13/00; G06N 99/005
See application file for complete search history.

(56) References Cited

U.S. PATENT DOCUMENTS

| 4,839,542 A * | 6/1989 | Robinson ............. G06G 7/184 |
| | | 327/558 |
| 2001/0043427 A1* | 11/2001 | Chen ............... G11B 5/5521 |
| | | 360/77.04 |
| 2013/0246318 A1* | 9/2013 | Kobayashi .......... G06N 99/005 |
| | | 706/12 |

FOREIGN PATENT DOCUMENTS

| CN | 103477116 A | 12/2013 |
|---|---|---|
| JP | 2-141015 A | 5/1990 |
| JP | 2001-168640 A | 6/2001 |
| JP | 2007-164406 A | 6/2007 |
| JP | 2012-62044 A | 3/2012 |
| JP | 2012-224258 A | 11/2012 |
| WO | 2014/167851 A1 | 10/2014 |

OTHER PUBLICATIONS

Neural Network based Speed Sensorless Induction Motor drives With Kalman Filter Approach Yoon-Ho Kim, Member, IEEE Yoon-Sang Kook (Year: 1998).*

(Continued)

*Primary Examiner* — Scott A. Waldron
*Assistant Examiner* — Ababacar Seck
(74) *Attorney, Agent, or Firm* — Hauptman Ham, LLP

(57) ABSTRACT

A machine learning apparatus, which learns a condition associated with a filter unit for filtering an analog input signal, includes a state observer for observing a state variable that includes at least one of a noise component and noise amount of an output signal from the filter unit and a responsivity to the input signal; and a learner for learning the condition associated with the filter unit in accordance with a training data set that includes the state variable.

8 Claims, 4 Drawing Sheets

(56) References Cited

OTHER PUBLICATIONS

A. Uncini, "Introduction to Adaptive Signal and Array Processing", Fundamentals of Adaptive Signal Processing, Signals and Communication Technology, Feb. 8, 2014, pp. 55-90, Chapter 2, Springer International Publishing, Switzerland, 36pp.
F. Woergoetter et al., "Reinforcement learning", Scholarpedia, last edited: Sep. 10, 2012, 1-15 pp., doi: 10.4249/scholarpedia.1448, retrieved on Mar. 13, 2019, 15pp.
"Q-learning", Wikipedia, last edited: Jul. 29, 2015, pp. 1-4, URL: https://en.wikipedia.org/w/index.php?title=Q-learning&oldid = 673625427, retrieved on Mar. 13, 2019, 4pp.
"Band-pass filter", Wikipedia, last edited: Jun. 2, 2015, pp. 1 and 3, URL: https://en.wikipedia.org/w/index.php?title=Bandpass_filter&oldid=665186525, retrieved on Mar. 13, 2019, 2pp.

* cited by examiner

MACHINE LEARNING TO ESTABLISH OPTIMAL FILTER FOR REMOVING EXTERNAL NOISE WITHOUT DEGRADING RESPONSIVITY

RELATED APPLICATIONS

The present application claims priority to Japanese Patent Application Number 2015-152682 filed Jul. 31, 2015, the disclosure of which is hereby incorporated by reference herein in its entirety.

BACKGROUND OF THE INVENTION

1. Field of the Invention

The present invention relates to a machine learning apparatus, a motor drive apparatus, a motor drive system, and a machine learning method, and specifically relates to a machine learning apparatus for learning a filter in accordance with a machine command, a motor drive apparatus and a motor drive system having the machine learning apparatus, and a machine learning method.

2. Description of Related Art

In motor drive apparatuses, analog signals are sometimes used in a circuit for detecting an electric current supplied to a motor and a circuit for feeding back the position of the motor. When noise is applied to the analog signal, the precision of an entire system is affected. Thus, the analog signal is subjected to a filter in order to remove the noise and eliminate the adverse effect on the precision of the entire system (for example, Japanese Unexamined Patent Publication (Kokai) No. 2012-062044, hereinafter called "patent document 1").

The patent document 1 discloses a communication control system that is applied to vehicles equipped with various devices that could be noise sources, to select a wireless communication method associated with the vehicle. The communication control system includes a detection means for detecting operation states of the various devices that become noise sources, an estimation means for estimating electromagnetic noise characteristics specific to the operation states based on the operation states of the various devices detected by the detection means, and a selection means for selecting a communication method in accordance with the electromagnetic noise characteristics estimated by the estimation means. This configuration allows for selecting the suitable communication method for the operation states of the various devices that become noise sources e.g. the rotating state of a motor in the vehicle, thus facilitating the establishment of good communication.

The larger the filter applied to the analog signal, the more noise is removed. However, too large of a filter degrades responsivity and loses immediacy. Also, since the amount and component of noise varies depending on the state of a system or a machine, an optimal filter is not constant, and thus a fixed filter is not always optimal.

SUMMARY OF THE INVENTION

The present invention aims to provide a machine learning apparatus that can establish an optimal filter for removing external noise in accordance with the state of a system or a machine by machine learning and to enable the removal of the external noise without degrading responsivity, a motor drive apparatus and a motor drive system having the machine learning apparatus, and a machine learning method.

A machine learning apparatus according to an embodiment of the present invention, for learning a condition associated with a filter unit for filtering an analog input signal, includes a state observer for observing a state variable that includes a noise component and noise amount of an output signal from the filter unit and a responsivity to the input signal; and a learner for learning the condition associated with the filter unit in accordance with a training data set that includes the state variable.

A motor drive apparatus according to the embodiment of the present invention includes the above-described machine learning apparatus.

A motor drive system according to the embodiment of the present invention includes the above-described motor drive apparatus and a machine commander for providing notification of information about the operation of a machine.

A machine learning method according to the embodiment of the present invention, for learning a condition associated with a filter unit for filtering an analog input signal, includes the steps of observing a state variable that includes a noise component and noise amount of an output signal from the filter unit and a responsivity to the input signal; and learning the condition associated with the filter unit in accordance with a training data set that includes the state variable.

BRIEF DESCRIPTION OF THE DRAWINGS

The objects, features, and advantages of the present invention will be more apparent from the following description of an embodiment in conjunction with the attached drawings, wherein.

DETAILED DESCRIPTION OF THE INVENTION

A machine learning apparatus, a motor drive apparatus, a motor drive system, and a machine learning method according to the present invention will be described below with reference to the drawings.

Figure 1:
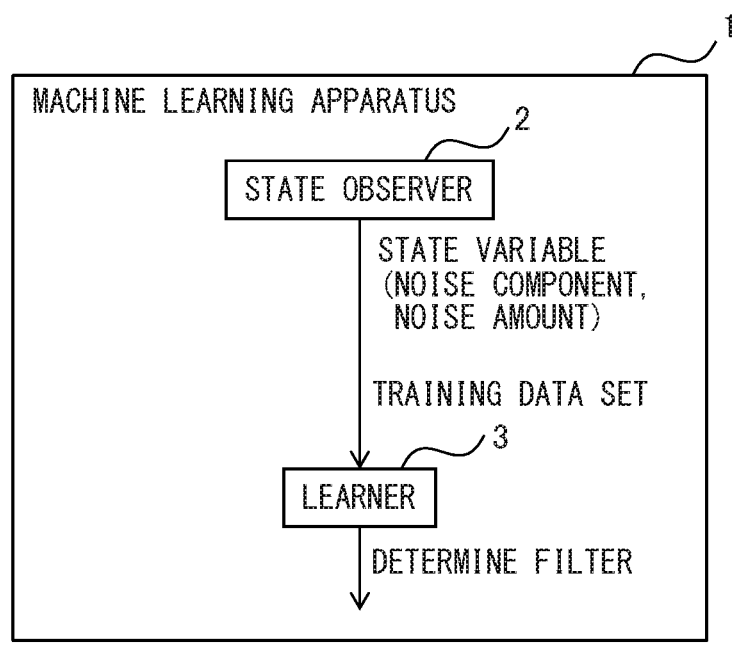
FIG. 1 is a block diagram of a machine learning apparatus according to an embodiment of the present invention.
Figure 2:
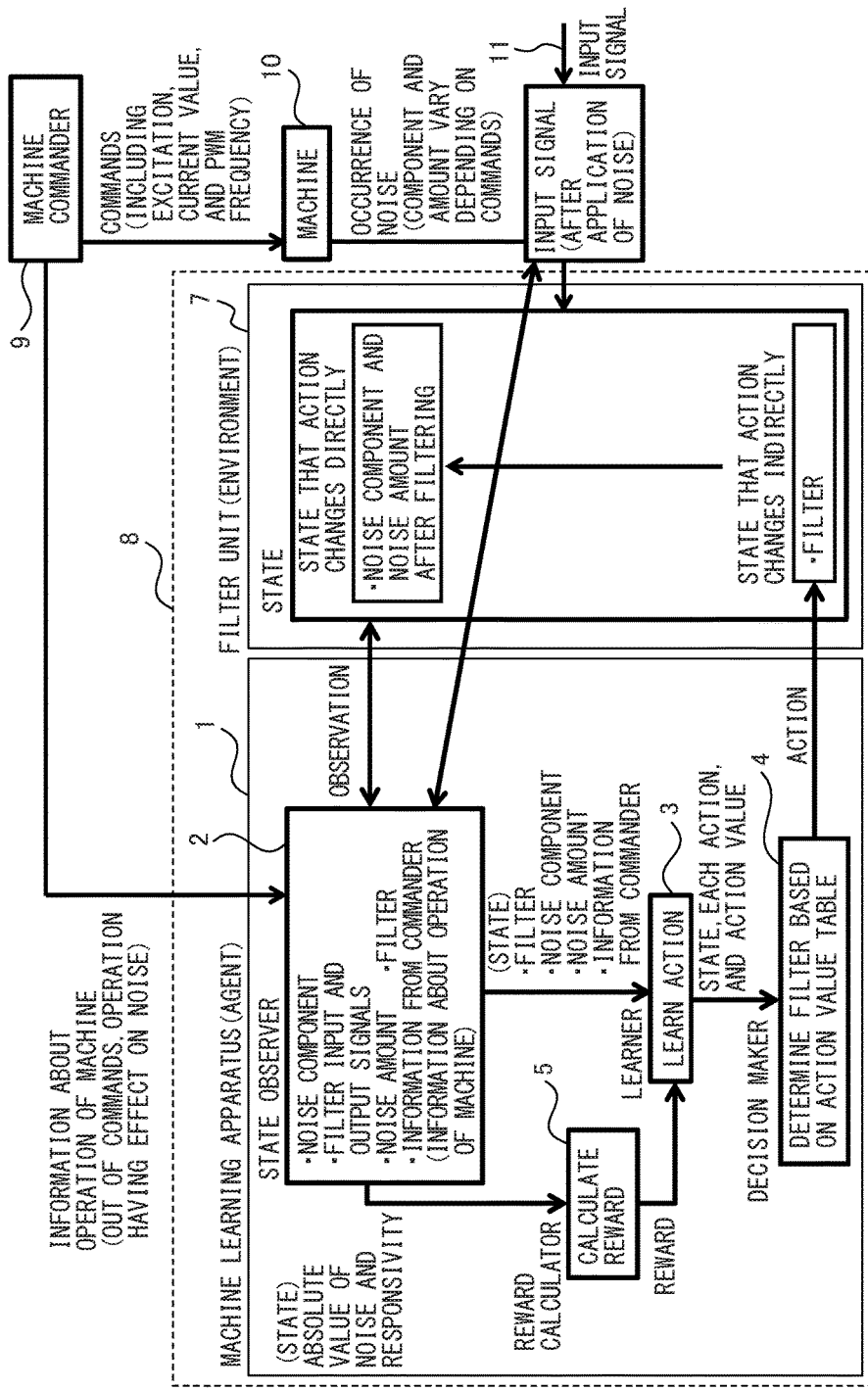
FIG. 2 is a block diagram of a motor drive system according to the embodiment of the present invention.

FIG. 1 is a block diagram of a machine learning apparatus according to an embodiment of the present invention. FIG. 2 is a block diagram of a motor drive system according to the embodiment of the present invention.

A machine learning apparatus 1 according to the embodiment of the present invention, which learns conditions associated with a filter unit for filtering an analog input signal, includes a state observer 2 and a learner 3.

The state observer 2 observes a state variable that includes a noise component and noise amount of an output signal from a filter unit 7 (see FIG. 2) and a responsivity to the input signal.

The learner 3 learns conditions associated with the filter unit 7 in accordance with a training data set that includes the state variable.

The state observer 2 observes information about a machine operating state from a machine commander 9. The learner 3 updates the training data set based on the information about the machine operating state.

The motor drive system shown in the block diagram of FIG. 2 is provided with only one filter unit 7, by way of example. However, the motor drive system is not limited to this example but may be provided with a plurality of filter units. Furthermore, the learner 3 may learn the conditions in accordance with training data sets acquired from the plurality of filter units.

The machine learning apparatus 1 preferably further includes a decision maker 4 that updates a filter based on the training data set, in response to the input of the current state variable, based on a result of learning by the learner 3 in accordance with the training data set.

The machine learning apparatus 1 preferably includes a reward calculator 5 and a function updater 6. The reward calculator 5 calculates a reward based on the noise component, the noise amount, and the responsivity. The function updater 6 updates a function to modify the filter unit from the current state variable, based on the reward.

When the noise amount is increased or the responsivity is lower than a specified value, the reward calculator 5 decreases the reward. When the noise amount is decreased and the responsivity is equal to or higher than the specified value, the reward calculator 5 increases the reward.

The function updater 6 preferably performs reinforcement learning using so-called Q-learning. The Q-learning is a method for learning a value (action-value) Q(s, a) for selecting an action "a" in a certain environment "s". In a certain state "s", an action "a" having the highest Q(s, a) value is selected as an optimal action. The function updater 6 updates a function (action-value function $Q(s_t, a_t)$) using the following equation (1).

$$Q(s_t, a_t) \leftarrow Q(s_t, a_t) + \alpha \left( r_{t+1} + \gamma \max_a Q(s_{t+1}, a) - Q(s_t, a_t) \right) \quad (1)$$

Here, $Q(s_t, a_t)$ represents the action-value function, $s_t$ represents a state (environment) at a time t, $a_t$ represents an action at the time t, $\alpha$ represents a learning coefficient, $r_{t+1}$ represents a reward, and $\gamma$ represents a discount factor. The action-value function indicates an expected value for the reward. A term with "max" represents the product of a Q value, when an action "a" having the highest Q value is selected in an environment $s_{t+1}$, and $\gamma$.

Setting both the learning coefficient and the discount factor at 1, the equation (1) is simplified into the following equation (2).

$$Q(s_t, a_t) \leftarrow r_{t+1} + \gamma \max_a Q(s_{t+1}, a) \quad (2)$$

This update equation indicates that, as compared with the value $Q(s_t, a_t)$ of an action "a" in an environment "s", if an optimal action value $Q(s_{t+1}, \max a_{t+1})$ in the next environmental state by the action "a" is higher, $Q(s_t, a_t)$ is increased. If not, $Q(s_t, a_t)$ is decreased. That is to say, the value of an action in a certain state is approximated to an optimal action value in the next state by the action.

As shown in FIG. 2, the state of the filter unit 7 includes a state that an action changes indirectly and a state that an action changes directly. The state that an action changes indirectly includes the noise component and the noise amount after filtering, and the responsivity. The state that an action changes directly includes the filter.

The learner 3 relearns and updates the conditions in accordance with an additional training data set, which includes the current state variable.

The machine learning apparatus 1 may be connected to the filter unit 7 through a network. The state observer 2 may acquire the current state variable through the network.

Next, a motor drive apparatus according to the embodiment of the present invention will be described. A motor drive apparatus 8 according to the embodiment of the present invention includes the above-described machine learning apparatus 1, and the filter unit 7 having a variable filter and a filter modifier for modifying the variable filter.

The machine learning apparatus 1 is preferably present in a cloud server.

A motor drive system includes the above-described motor drive apparatus 8, the machine commander 9, a machine 10, and receives an analog input signal 11. The machine commander 9, as well as applies commands to the motor drive apparatus 8 and the machine 10, sends conditions associated with noise, out of the command, to the motor drive apparatus 8. The analog input signal 11 is a feedback signal. Noise is applied to the analog input signal 11 by the motor drive apparatus 8 and the machine 10.

Next, a machine learning method according to the embodiment of the present invention will be described. The machine learning method according to the embodiment of the present invention, for learning conditions associated with a filter unit for filtering an analog input signal, includes the steps of observing a state variable that includes a noise component and noise amount of an output signal from the filter unit and a responsivity to the input signal, and learning the conditions associated with the filter unit in accordance with a training data set that includes the state variable.

Figure 3:
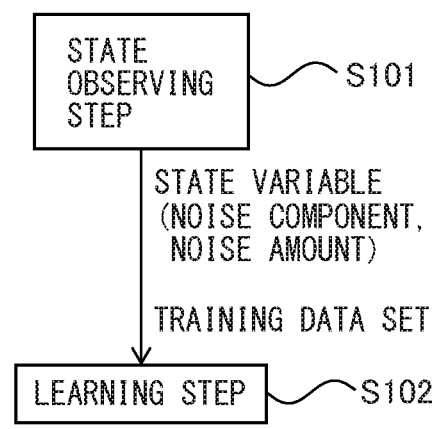
FIG. 3 is a flowchart for explaining the operation process of the machine learning apparatus according to the embodiment of the present invention.

FIG. 3 is a flowchart for explaining the operation process of the machine learning apparatus according to the embodiment of the present invention. First, in step S101, a state variable, which includes a noise component and noise amount of an output signal from the filter unit 7 and responsivity to an input signal to the filter unit 7, is observed.

Next, in step S102, conditions associated with the filter unit 7 are learned in accordance with a training data set that includes the state variable.

Figure 4:
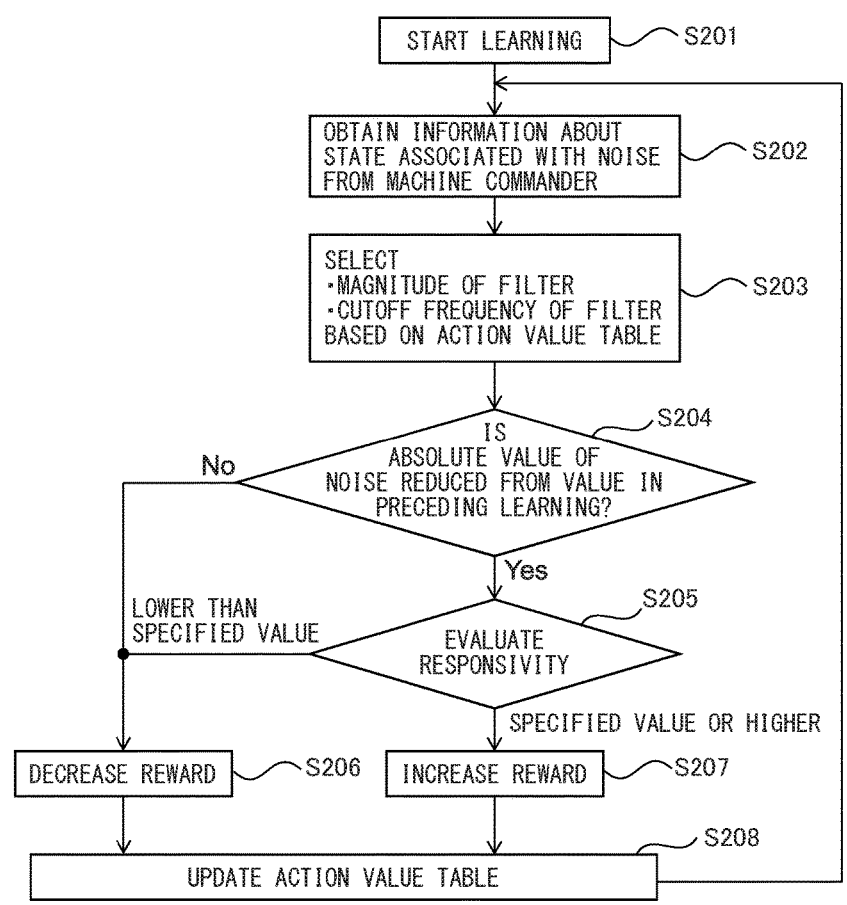
FIG. 4 is a flowchart for explaining the operation process of the motor drive system according to the embodiment of the present invention.

Next, a machine learning method using the motor drive apparatus according to the embodiment of the present invention will be described. FIG. 4 is a flowchart for explaining the operation process of the motor drive apparatus according to the embodiment of the present invention. First, learning is started in step S201.

Next, information of a state associated with noise is obtained from the machine commander 9 in step S202.

Next, in step S203, the magnitude of a filter and the cutoff frequency of the filter are selected based on an action value table. After that, the action value table is updated in step S208.

Next, in step S204, whether or not an absolute value of the noise is reduced as compared with a value in the preceding learning is determined. When the absolute value of the noise is not reduced from the value in the preceding learning, in step S206, a reward is decreased.

On the other hand, when the absolute value of the noise is reduced from the value in the preceding learning, in step S205, the evaluation of the responsivity is performed.

When the responsivity is lower than a specified value, in step S206, the reward is decreased. After that, the action value table is updated in step S208.

On the other hand, when the responsivity is equal to or higher than the specified value, in step S207, the reward is increased. After that, the action value table is updated in step S208.

The action value table is updated in step S208 so as to determine which item of the action value table on which the filter is to be modified, in decreasing order of an action value point. After that, the filter is modified on the determined item such that, returning to step S202, the action value associated with the noise component, the noise amount, and the responsivity of the filter is optimized.

As described above, according to the machine learning apparatus, the motor drive apparatus and the motor drive system having the machine learning apparatus, and the machine learning method according to the embodiment of the present invention, it is possible to establish an optimal filter by machine learning for removing an external noise in accordance with the state of a system or a machine.

According to the present invention, it is possible to provide the machine learning apparatus that can establish an optimal filter by machine learning for removing an external noise in accordance with the state of a system or a machine in order to enable the removal of the external noise without degrading responsivity, the motor drive apparatus and the motor drive system having the machine learning apparatus, and the machine learning method.

What is claimed is:

1. A machine learning apparatus for learning magnitude and cutoff frequency of a filter as a condition associated with the filter for filtering an analog input signal to a motor drive apparatus, the machine learning apparatus comprising:
    a processor configured to
        observe a state variable that includes the magnitude and the cutoff frequency of the filter as a state that an action changes directly, and a noise component and noise amount of an output signal from the filter and a responsivity to the input signal as a state that an action changes indirectly, wherein the magnitude and the cutoff frequency of the filter are selected based on an action value table, and
        perform learning the magnitude and the cutoff frequency of the filter as the condition associated with the filter in accordance with a training data set that includes the state variable,
    wherein the filter is modified based on a result of said learning such that an action value of the action value table is optimized.

2. The machine learning apparatus according to claim 1, wherein
    the processor is further configured to
        observe information about a machine state from a machine commander, and
        update the training data set based on the information about the machine state.

3. The machine learning apparatus according to claim 1, wherein
    the processor is configured to
        learn the condition in accordance with training data sets acquired on a plurality of filters.

4. The machine learning apparatus according to claim 1, wherein
    the processor is further configured to
        calculate a reward based on the noise component, the noise amount, and the responsivity, and
        update a function to modify the filter from the current state variable based on the reward.

5. The machine learning apparatus according to claim 4, wherein
    the processor is further configured to
        decrease the reward when the noise amount is increased or the responsivity is lower than a specified value, and
        increase the reward when the noise amount is decreased and the responsivity is equal to or higher than the specified value.

6. The machine learning apparatus according to claim 4, wherein
    the processor is configured to
        relearn and update the condition in accordance with an additional training data set that includes the current state variable.

7. The machine learning apparatus according to claim 6, wherein
    the machine learning apparatus is connected to the filter through a network, and
    the processor is configured to acquire the current state variable through the network.

8. A machine learning method for learning magnitude and cutoff frequency of a filter as a condition associated with the filter for filtering an analog input signal to a motor drive apparatus, the machine learning method comprising:
    observing a state variable that includes the magnitude and the cutoff frequency of the filter as a state that an action changes directly, and a noise component and noise amount of an output signal from the filter and a responsivity to the input signal as a state that an action changes indirectly, wherein the magnitude and the cutoff frequency of the filter are selected based on an action value table;
    learning the magnitude and the cutoff frequency of the filter as the condition associated with the filter in accordance with a training data set that includes the state variable; and
    modifying the filter based on a result of said learning such that an action value of the action value table is optimized.

* * * * *